3,386,160
METHOD OF MANUFACTURING A REFRACTORY METAL-TO-CERAMIC SEAL

Alfred Milch, Teaneck, N.J., and Joseph J. Lalak, Briarcliff Manor, and Richard H. Ahlert, Spring Valley, N.Y., assignors to North American Philips Co., Inc., New York, N.Y., a corporation of Delaware
No Drawing. Application Oct. 7, 1966, Ser. No. 584,966, now Patent No. 3,366,466, dated Jan. 30, 1968, which is a continuation-in-part of application Ser. No. 364,739, May 4, 1964. Divided and this application Oct. 26, 1967, Ser. No. 678,169
8 Claims. (Cl. 29—473.1)

ABSTRACT OF THE DISCLOSURE

A method of manufacturing a refractory ceramic-to-metal seal in which the refractory metals tantalum and niobium are joined to a metallized ceramic by means of special alloys containing tantalum and niobium.

---

This application is a division of application Ser. No. 584,966, filed Oct. 7, 1966, now Patent No. 3,366,466 issued on Jan. 30, 1968, which application is a continuation-in-part of application Ser. No. 364,739, filed May 4, 1964, now Patent No. 3,340,025 issued on Sept. 5, 1967.

The invention relates to a method of manufacturing refractory hermetic ceramic-to-metal seals between refractory ceramics such as alumina, spinels, magnesia, synthetic sapphire, and the like and tantalum and niobium.

In the copending application above referred to we have disclosed refractory ceramic-to-metal seals obtained by forming on the ceramic a layer of a spongy refractory metal such as molybdenum, tungsten, and mixtures of these metals which is then covered with a metal which is capable of wetting the refractory metal sponge. Such wetting metals are rhenium, alloys of molybdenum and ruthenium and alloys of rhodium and molybdenum of composition as disclosed in the copending application. The spongy refractory metal layer covered with the wetting metal is then brazed to a refractory metal using, in the case of rhenium as a wetting metal conventional braze metals, and in the case of the alloy of molybdenum and ruthenium, or the alloy of rhodium and molybdenum a refractory brazing metal whose melting point does not exceed that of the wetting metal.

Although it is disclosed in that application that tantalum and niobium may be sealed to the ceramic in this manner provided precautions are taken to employ a vacuum or inert atmosphere during brazing, such seals are not always hermetic. In order to obtain a highly-refractory hermetic seal, we have found that special brazing alloys, which are not disclosed as such in that application, must be employed. More particularly, we have found in order to obtain a hermetic seal when brazing the metallized ceramic to niobium or tantalum, it is essential to employ as a braze material a refractory alloy which does not form low melting phases with the wetting metal and/or the tantalum or niobium member being sealed.

Since both tantalum and niobium have coefficients of thermal expansion very close to that of alumina, seals made in accordance with the invention will experience minimum mechanical stress during change in temperature. Thus where an extremely high degree of thermal stability is required, seals made according to this invention acquire a high degree of technological importance.

The following examples are illustrative of the invention which is defined in the appended claims.

An alumina cylinder was prepared for brazing according to the teachings of our copending application Ser. No. 364,739, filed May 4, 1964, by applying a layer of $MoO_3$ suspended in distilled water to an alumina cylinder, allowing this layer to dry, and heating the so-coated alumina cylinder in wet hydrogen to reduce the $MoO_3$ and sinter the resulting molybdenum in order to obtain a tightly adherent layer of molybdenum sponge on the alumina. A 0.005″ thick tantalum disc was hermetically brazed to the metallized alumina with an alloy of Ta-Rh in vacuum. A eutectic mixture of Ta-Rh with a melting point of 1740° C. at 31.5 weight percent of Rh was employed as both wetting and brazing agent. The above braze has been re-heated to 1550° C., the melting point of palladium, and remains vacuum tight. The permissible composition range of the wetting and brazing alloy compatible with the softening point of high alumina ceramics is 19 weight percent to 52 weight percent Rh.

An alumina to niobium seal was accomplished in a slightly different manner. A cleaned high alumina tube was coated with a suspension of $MoO_3$ in distilled water and allowed to air dry. A second layer consisting of $RuO_2$ and $MoO_3$, corresponding to the eutectic mixture of Ru and Mo, suspended in nitrocellulose amyl acetate binder was painted over this layer. Firing in a wet hydrogen atmosphere reduced the oxides, sintered the essentially pure first layer of Mo to form a tightly adherent spongy molybdenum layer and at the same time melted the Ru-Mo overlayer at the eutectic temperature of 1950° C. The thus metallized and wetted alumina was hermetically brazed to a 0.005″ disc of niobium in vacuum using a eutectic mixture of 63 weight percent iridium and 37 weight percent of niobium (M.P. 1840° C.) as the brazing agent. The permissible composition range of the brazing alloy compatible with the softening point of high alumina ceramics is 53 weight percent Ir to 71 weight percent Ir. The above ceramic-to-metal braze has been re-heated in vacuum to 1773° C., the melting point of platinum, and remains vacuum tight.

Another braze alloy that has been used to seal alumina to niobium is Rh-Nb. The initial metallizing of an alumina tube was done as described above. Since rhodium was a component of the braze material, we chose to employ an alloy of Rh-Mo as the wetting agent instead of Ru-Mo. The wetting agent employed was the eutectic mixture of Rh and Mo which was melted into the underlying Mo sponge at 1945° C. A niobium disc was then brazed in vacuum with a eutectic mixture of Rh-Nb having 50 weight percent Rh and melting at 1500° C. The permissible composition range of the brazing alloy compatible with the softening point of high alumina ceramics is 20% to 100% Rh by weight.

It appears that in order to obtain an extremely refractory hermetic seal between tantalum or niobium and a refractory ceramic such as alumina, it is essential to employ a refractory brazing alloy containing tantalum or niobium. We wish to point out in this regard, however, that when brazing alumina metallized by a porous metal layer with a braze material containing niobium, it is preferable that the wetting agent be melted into the pores of the metallizing layer. If this is not done, the resulting bond is much less reliable with respect to temperature recycling as shown by the following experiment:

Two alumina tubes were metallized with a spongy molybdenum layer, rendered wettable by Rh-Mo, and brazed to niobium discs with Rh-Nb as described above. In the case of a tube A the Rh-Mo was melted into the sponge at 1945° C.; in the case of tube B the Rh-Mo was heated in a similar manner, but only to 1750° C. so that no melting occurred. Ofter brazing, tube A was recycled to 1235° C., 1340° C., 1400° C., 1450° C. and 1500° C. The brazed joint was tested after each temperature cycling and found to be vacuum tight. Tube B, in which the Rh-Mo was not melted, was vacuum tight after recycling to 1235° C. but failed upon recycling to 1340° C.

Thus, in order to prevent attack of the ceramic when niobium is used, we have found it necessary to employ as a wetting metal one which also serves as a coating on the metallized surface of the ceramic preventing destructive attack by the niobium bearing materials, i.e., the braze materials. Furthermore, we have found that unless the wetting material is melted into the pores the brazing operation is more difficult to perform and the percentage of failure is higher.

The term "inert" atmosphere is defined to mean herein and in the claims, vacuum or gaseous atmospheres which do not react or substantially do not react destructively with any of the metals herein disclosed.

It should also be understood that wherever the terms "tantalum" and "niobium" are referred to herein, these terms shall not only include the essentially pure elements but also alloys and compositions thereof in which either of those elements is the predominant constituent thereof.

While the invention has been described with reference to particular embodiments and applications thereof, other modifications will be apparent to those skilled in the art without departing from the spirit and scope of the invention which is defined in the appended claims.

What is claimed is:

1. A method of manufacturing a refractory hermetic ceramic-to-metal seal comprising the steps of forming on the surface of a body of refractory ceramic selected from the group consisting of alumina, magnesia, spinel, and synthetic sapphire a layer of spongy refractory metal selected from the group consisting of molybdenum, tungsten, and mixtures of molybdenum and tungsten, melting a wetting metal in contact with said spongy layer, said wetting metal being selected from the group consisting of Ta-Rh alloys, Rh-Mo alloys, and Ru-Mo alloys and filling the pores of said spongy layer therewith, and joining the so-covered surface of the ceramic body to a body of a refractory metal selected from the group consisting of tantalum and niobium by brazing in an inert atmosphere with a metal alloy selected from the group consisting of tantalum alloys and niobium alloys and having a melting point not exceeding that of the wetting alloy and lower than the melting point of the bodies joined thereby.

2. A method of manufacturing a refractory hermetic ceramic-to-metal seal as claimed in claim 1, in which the body of refractory metal is tantalum and the metallic material wetting and filling the spongy metal layer and joining the tantalum thereto is an alloy of tantalum and rhodium.

3. A method of manufacturing a refractory hermetic ceramic-to-metal seal as claimed in claim 2, in which the wetting and brazing alloy contains between 19 and 52 weight percent of rhodium.

4. A method of manufacturing a refractory hermetic ceramic-to-metal seal as claimed in claim 2, in which the wetting and brazing alloy is a eutectic mixture of tantalum and rhodium.

5. A method of manufacturing a refractory hermetic ceramic-to-metal seal as claimed in claim 1, in which the body of refractory metal is niobium and the brazing alloy is an alloy of niobium and rhodium containing between 20 and 100% by weight of rhodium.

6. A method of manufacturing a refractory hermetic ceramic-to-metal seal as claimed in claim 5, in which the brazing alloy is a eutectic mixture of niobium and rhodium.

7. A method of manufacturing a refractory hermetic ceramic-to-metal seal as claimed in claim 1, in which the body of refractory metal is niobium and the brazing alloy is an alloy of niobium and 53 to 71 weight percent of iridium.

8. A method of manufacturing a refractory hermetic ceramic-to-metal seal as claimed in claim 7, in which the brazing alloy is a eutectic mixture of niobium and iridium.

References Cited

UNITED STATES PATENTS

| | | | |
|---|---|---|---|
| 2,776,472 | 1/1957 | Mesick | 29—492 X |
| 2,830,169 | 4/1958 | Medicus | 219—92 |
| 2,844,868 | 7/1958 | Cline | 29—198 X |
| 2,996,401 | 8/1961 | Welch. | |
| 3,023,492 | 3/1962 | Bristow | 29—195 |
| 3,024,522 | 3/1962 | Cacciotti | 29—195 |
| 3,107,756 | 10/1963 | Gallet | 29—473.1 X |
| 3,110,101 | 11/1963 | Kieffer | 29—198 X |
| 3,132,928 | 5/1964 | Crooks | 29—198 |
| 3,312,539 | 4/1967 | Marshall | 29—198 |
| 3,339,267 | 9/1967 | Bronnes | 29—473.1 |

OTHER REFERENCES

High Temperature Brazing, 75/172, Battelle Technical Review, vol. 5, No. 8, August 1956, pp. 8–12, by Robert M. Evans.

JOHN F. CAMPBELL, *Primary Examiner.*

R. F. DROPKIN, *Assistant Examiner.*